(12) United States Patent
Leung

(10) Patent No.: US 10,856,140 B2
(45) Date of Patent: Dec. 1, 2020

(54) UNIVERSAL PASSIVE PROVISIONING UNIT AND METHOD FOR SECURE ELEMENT

(71) Applicant: Ka Wai Wayne Leung, Hong Kong (CN)

(72) Inventor: Ka Wai Wayne Leung, Hong Kong (CN)

( * ) Notice: Subject to any disclaimer, the term of this patent is extended or adjusted under 35 U.S.C. 154(b) by 212 days.

(21) Appl. No.: 15/781,830

(22) PCT Filed: May 1, 2018

(86) PCT No.: PCT/IB2018/053003
§ 371 (c)(1),
(2) Date: Jun. 6, 2018

(87) PCT Pub. No.: WO2019/155270
PCT Pub. Date: Aug. 15, 2019

(65) Prior Publication Data
US 2019/0132730 A1 May 2, 2019

(30) Foreign Application Priority Data

Feb. 9, 2018 (WO) .................. PCT/IB2018/050802
Feb. 9, 2018 (WO) .................. PCT/IB2018/050803

(51) Int. Cl.
*G06F 21/00* (2013.01)
*H04W 12/00* (2009.01)
(Continued)

(52) U.S. Cl.
CPC ........ *H04W 12/0013* (2019.01); *G06F 21/31* (2013.01); *G06F 21/32* (2013.01);
(Continued)

(58) Field of Classification Search
CPC .................................................. H04W 12/0013
See application file for complete search history.

(56) References Cited

U.S. PATENT DOCUMENTS

2016/0085329 A1* 3/2016 Yim ........................ G06F 3/041
345/173
2019/0095655 A1* 3/2019 Krawczewicz ........... H04L 9/32

FOREIGN PATENT DOCUMENTS

| CN | 103177228 A | 6/2013 |
|---|---|---|
| CN | 105303229 A | 2/2016 |

* cited by examiner

*Primary Examiner* — Josnel Jeudy
(74) *Attorney, Agent, or Firm* — Muncy, Geissler, Olds & Lowe, P.C.

(57) ABSTRACT

A battery-less active and passive hybrid device for secure wireless payment comprising a secure element adapted for storing at least one secure applet and at least one data segment for secure contactless data transaction and operatively connected with an active operation unit and a passive operation unit; and preferably the active operation unit is adapted to be connected removably with the secure element; and wherein the hybrid device is configured to be switchable between an active state in which the active operation unit is activated on demand to enable the hybrid device to function as an active device and adapted for provisioning a personalization information and/or a token of the device to the secure element; and a passive state in which the active operation unit is deactivated and the passive operation unit is activated to enable the hybrid device to function as a passive device and adapted for conducting data verification and/or contactless data transaction operation via the secure element.

19 Claims, 6 Drawing Sheets

(51) Int. Cl.
*H04W 12/06* (2009.01)
*H04W 4/80* (2018.01)
*G06Q 20/32* (2012.01)
*G06F 21/32* (2013.01)
*G07F 7/08* (2006.01)
*G06F 21/31* (2013.01)
*G06F 21/35* (2013.01)

(52) U.S. Cl.
CPC .............. *G06F 21/35* (2013.01); *G06Q 20/32* (2013.01); *G06Q 20/3278* (2013.01); *G07F 7/082* (2013.01); *G07F 7/0893* (2013.01); *H04W 4/80* (2018.02); *H04W 12/06* (2013.01)

UNIVERSAL PASSIVE PROVISIONING UNIT AND METHOD FOR SECURE ELEMENT

TECHNICAL FIELD

The present disclosure relates to contactless secure transaction methods and systems such as for mobile payments or data transactions, and more particularly to an universal passive provisioning unit and method for secure element for enabling and implementing a battery-less active and passive hybrid device for secure contactless or wireless data application/operation/communication.

BACKGROUND ART

Named for its founders (Europay, MasterCard, and Visa) in 1994, EMV now defines a set of security standards for credit and debit card transactions that can be used for NFC mobile and contactless payments. The "EMV cards" or "EMV credit cards" use a smart chip instead of a magnetic stripe to hold the data required to process a transaction. EMV brings increased security and global interoperability to card and mobile payments. The chip on an EMV card is capable of much more sophisticated authentication than magnetic-stripe cards. Essentially, there is a fully operating computer system embedded in every EMV card. The chip is tamper-proof, making the card nearly impossible to clone.

As EMV is almost one hundred percent effective when it comes to preventing face-to-face (in-store) counterfeit card fraud, and the tap-and-go convenience of a contactless EMV card is likely leading to increased loyalty and spending on that card. In this way, it is desirable to incorporate the EMV card or the like into various mobile wearable devices for conducting contactless or mobile payment operations.

With mobile EMV the customer's account credentials are loaded directly onto an NFC-enabled cell phone or wearable device. This is just as secure as contactless EMV, but with superior convenience and added opportunities, In particular, existing contactless payment systems are making use of EMV credit cards or equivalent cards (e.g. UnionPay cards) and smart mobile devices with a secure element that use wireless communication module (e.g. NFC) for making secure payments, such as smartphones, smartwatches, or the like.

The embedded chip and antenna of the contactless payment system enable users to wave their smartphones or smartwatches over a reader at the point of sales terminal to make relatively low value transactions. As you don't need to count your coins or pull out your bulky wallet to pay in cash anymore, so no more awkward moments when there is a long queue staring at you counting money. Worldwide fast food chains and convenient stores are already using these POS terminals for conducting contactless payment transactions.

The smart mobile devices, such as smartwatches, adopted by the contactless payment systems utilizing the secure element generally comprise a contactless active payment unit or module needs to be powered by an embedded powerful battery thereof. However, quite a few people do not want to use any smartwatch or smart wearables and prefer traditional watches or wearables for various reasons. Moreover, it is desirable that the existing secure element for smart mobile devices could be also adapted for use in other kinds of contactless secure data transaction/communication system apart from the contactless payment system.

BRIEF SUMMARY OF INVENTION

The present disclosure relates to a battery-less active and passive hybrid device for secure wireless data transaction comprising a secure element adapted for storing at least one secure applet and at least one data segment for secure contactless data transaction and operatively connected with an active operation unit and a passive operation unit; and preferably the active operation unit is adapted to be connected removably with the secure element; and wherein the hybrid device is configured to be switchable between an active state in which the active operation unit is activated on demand to enable the hybrid device to function as an active device and adapted for provisioning one or more personalization information data, biometric data, health data, government related security data, hardware specific data, and/or a token of the device to the secure element; and a passive state in which the active operation unit is deactivated and the passive operation unit is activated/configured to enable the hybrid device to function as a passive device and adapted for conducting data verification and/or contactless data transaction operation via the secure element. As the hybrid device is battery-less and activated on demand, it can be incorporated into a traditional timepiece or the like for provision of contactless payment capability.

The present disclosure also relates to a method for providing contactless data transaction capabilities to a traditional wearable device by a battery-less active and passive hybrid device for secure wireless data transaction comprising a secure element adapted for storing at least one secure applet and at least one data segment for secure contactless data transaction and operatively connected with an active operation unit, preferably adapted to be connected removably with the secure element, and a passive operation unit, comprising steps of: mounting or embedding the battery-less active and passive hybrid device at or into the traditional wearable device; switching or setting the hybrid device to an active state by having the active operation unit activated on demand to enable the hybrid device to function as an active device and the secure element provisioned with one or more personalization information data, biometric data, health data, government related security data, hardware specific identification data, and/or a token of the device; and switching or setting the hybrid device to a passive state by having the active operation unit deactivated and the passive operation unit activated/configured to enable the hybrid device to function as a passive device and the secure element configured for conducting data verification and/or contactless data transaction operation via the secure element.

In some embodiments, while in the active state the active operation unit is activated by operatively coupled with and powered by a power transfer unit for conducting wireless data communication with a provisioning unit, preferably a smartphone, for provisioning of the personalization information data, biometric data, health data, government related security data, hardware specific data, and/or the token of the device to the secure element from the provisioning unit. The employment of the active operation unit enables the user to make use of other cards or secure applications by provisioning the personalization information of new payment card or other secure data or applets to the secure element.

In some other embodiments, while in the passive state the passive operation unit is activated by operatively coupled with and wirelessly powered by a data transaction unit, preferably a data transaction terminal, for conducting data verification and/or contactless data transaction operation with the data transaction unit via the secure element.

In some embodiments of the hybrid device according to the present disclosure, the active operation unit comprises a first wireless communication unit adapted for coupling and conducting wireless data communication with the provisioning unit, and operatively coupled with a power receiver unit and/or a transient power storage unit, preferably a supercap, adapted for receiving and/or storing power from the coupled power transfer unit. In some embodiments, the transient power storage unit is omitted, though the incorporation of the optional transient power storage unit might enable the hybrid device to be operated continuously as an active device for a period of time when the power transfer unit is decoupled with the active operation unit, which might be desirable to some specific applications.

In some embodiments, the first wireless communication unit is a WIFI, BT, and/or NFC enabled communication unit, and preferably a BLE unit with contacts, preferably waterproof and/or exposed contacts. Preferably, the power transfer unit is a USB power transmitter, preferably equipped with connection members, preferably connection pins or hooks, and/or fixing or locking members for making contact and/or interlocking with the contacts of the BLE unit.

In some embodiments, the passive operation unit comprises a second wireless communication unit, preferably a NFC enabled communication unit, adapted for coupling and conducting wireless data communication with the data transaction unit and operatively coupled with an antenna unit for receiving its operating power and data transaction data and signals from the coupled data transaction unit.

In some embodiments, the second wireless communication unit is a NFC enabled communication unit, and preferably a NFC passive target unit draw its operating power from the data transaction unit acting as a NFC initiator unit. Preferably, the antenna unit comprises an antenna of a dimension of 10×24 mm adapted to draw operating power directly from a data signal generated from the data transaction unit without incorporating any active booster for amplifying the data signal.

In some embodiments, the secure element, the active operation unit, and the passive operation unit are configured to be operatively coupled with each other and mounted on a battery-less bendable board adapted for easy mounting on a non-planar or a curved surface or being readily insertable or embedded into a curved accommodating space; or the active operation unit is adapted to be removably connected with the secure element and/or integrated with the power transfer unit; and/or the hybrid device further comprise a biometric unit for biometric authentication comprising one or more biometric readers/sensors for reading, writing and/or processing biometric data related to fingerprint, palm/finger vein pattern, voice pattern, face recognition, DNA, palm print, hand geometry, iris recognition, and/or retina.

In some embodiments, the active operation unit is integrated with a power transfer or receiver unit and/or an interface for power transfer to form an universal passive provisioning unit for secure element being substantially in form of a clip/clamp or a forepart of clothes-pin and comprising a lower part with a flattened portion located at its proximal end and a depressed portion at its distal end on which a plurality of connection members are arranged for enabling power and signal transmission; and an upper part hingeably mounted over the lower part to be switchable between an opened position/state in which its proximal end is configured to make contact with the proximal end of the lower part and its distal end is configured to disengage with the distal end of the lower part to make the connection members and depressed portion accessible and a closed position/state in which its distal end is configured to make contact with the distal end of the lower part and its proximal end is configured to disengage with the proximal end of the lower part to make the connection members and depressed portion covered and concealed by the upper part.

The hybrid device provided by the present disclosure is simple in structure, reasonable in design, high in comfort and low in cost, such that it enables a proper integration with a traditional wearable device and the provision of a versatile wearable device for secure wireless payment and secure wireless data transaction/communication.

BRIEF DESCRIPTION OF DRAWINGS

The present disclosure will be described in details below with reference to the accompanying drawings, in which.

DETAILED DESCRIPTION OF INVENTION

The present disclosure will now be described in further details with reference to the accompanying drawings and embodiments, so as to make the objects, technical solutions and advantages of the present disclosure more apparent.

The present disclosure relates to devices and methods for use with EMVCo payment applets provisioning processes on secure element residing on a battery-less and bendable active board environment. The respective terms "EMVCo" or "EMV" means a consortium of Europay, MasterCard, Visa and others, "SE" means a secure element, "NFC" means Near Field Communications or relevant protocols, "BLE" means Bluetooth low energy or the like, and "Payment Applets" means contactless applications residing in SE.

Further, the term "Bendable Active Board" means a platform of bendable nature that consists of a SE for storing secure payment applets and tokens; a Bluetooth module for communications with paired devices; an NFC inductance antenna to receive power from NFC point of sale terminal in turn powering the SE; a wireless interface to receive power from an external source to enable the Bluetooth module on demand.

The respective terms "API" means application programming interface; "PAN" means a payment card primary account number; "Token" means a surrogate replacing the PAN, "Token services" means API offerings from payment network schemes not limited to Visa and Mastercard, where the primary functions are to exchange payment card PANs with surrogates as well as the management of such payment accounts; "Token Band" means an active or passive wearable device or strap/band capable of storing payment token; 'Token Dock" means a standalone power source docking system capable of transferring power wirelessly to the to Token Band; "Basic Wearable" means wearable that do not support loading of third party applications; and "Smart Wearable" means wearable that can support loading of third party applications.

In addition, the term "passive provisioning unit", "passive data provisioning unit", or the term "active operation unit" used herein means a passive or battery-less device or component capable of enabling an apparatus comprising a secure element, with which it operatively connected, coupled, or cooperated, to function as an active device on demand and adapted for provisioning one or more personalization information data, biometric data, health data, government related security data, hardware specific data, and/or a token of the apparatus/device to the secure element in electric and/or signal connection therewith; and the term "passive operation unit" means a passive or battery-less device or component capable of enabling the apparatus with which it operatively connected, coupled, or cooperated to function as a passive device on demand and adapted for conducting data verification and/or contactless data transaction operation, such as payment transaction operation, via the secure element.

Figure 1:
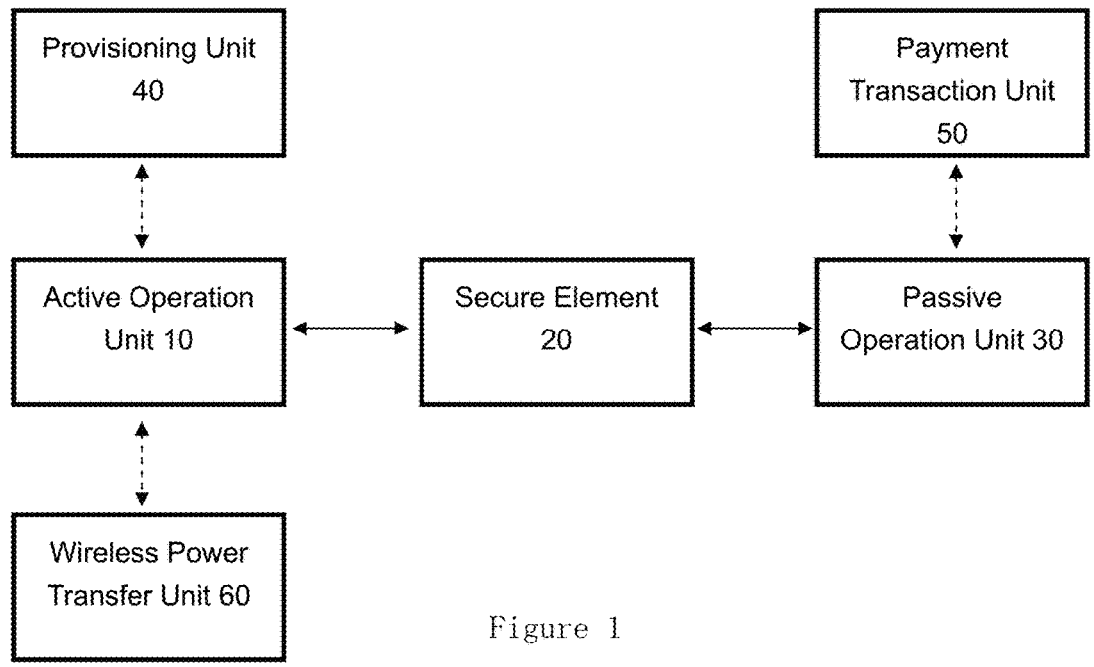
FIG. 1 is a block diagram of a battery-less active and passive hybrid device according to a preferred embodiment of the present disclosure.

Referring to FIG. 1, a block diagram of a battery-less active and passive hybrid device according to a preferred embodiment of the present disclosure is illustrated, according to which the hybrid device for secure wireless payment comprises a secure element 20 adapted for storing at least one secure payment applet and at least one token for secure contactless payment and operatively connected with a passive data provisioning unit/an active operation unit 10 and a passive operation unit 30.

The hybrid device is configured to be switchable between an active state and a passive state in response to the working requirements and conditions for various operations as required. In the active state, the active operation unit 10 is activated and powered preferably wirelessly on demand, e.g, by an external power source or initiator/activator, to enable the hybrid device to function as an active device, and it is adapted for various operations requiring a relatively high and stable power consumption, among other, the operations for provisioning a personalization information of a payment card and/or a payment token of the device to the secure element. In this regard, the active operation unit enables the hybrid device to support installing and loading of third party applications by the end user.

In the passive state, the active operation unit is deactivated, and/or decoupled with external initiator, and the passive operation unit is activated to enable the hybrid device to function as a passive device and adapted for various operations requiring a relatively low or transient power consumption, among other, conducting payment token verification and/or contactless payment transaction operation via the secure element, wherein the low or transient operating power could be drawn from a predetermined matching device adapted for working with a passive device.

In some embodiments such as the embodiment as shown in the FIG. 1, while in the active state the active operation unit 10 is activated by operatively coupled with and powered wirelessly by a wireless power transfer unit 60 for conducting wireless data communication with a provisioning unit, such as a dedicated machine, or a computer, a smart or mobile device comes with a dedicated module for provisioning data to the secure element 20, whereby enabling the provisioning of the personalization information of the payment card and/or the payment token of the device to the secure element from the provisioning unit.

In some embodiment such as the embodiment as shown in the FIG. 1, while in the passive state the passive operation unit 30 is activated by operatively coupled with and wirelessly powered by a payment transaction unit 50, such as a dedicated machine terminal, or a computer, a smart or mobile device comes with a dedicated module for contactless payment transaction with the secure element 20, whereby enabling the conducting of payment token verification and/or contactless payment transaction operation with the payment transaction unit via the secure element.

In some embodiments, the active operation unit comprises a first wireless communication unit adapted for coupling and conducting wireless data communication with the personalization information and payment token provisioning unit. The first wireless communication unit is operatively coupled with a wireless power receiver unit and/or a transient power storage unit, preferably a supercap, adapted for receiving and/or storing power from the coupled wireless power transfer unit, so as to enable the completion of routine and specific operations of the hybrid device requiring a relatively high and stable operating power.

In some embodiments, the first wireless communication unit is a WIFI, BLE, and/or NFC enabled communication unit.

In some embodiments, the passive operation unit comprises a second wireless communication unit, adapted for coupling and conducting wireless data communication with the payment transaction unit and operatively coupled with an antenna unit for receiving its operating power and payment transaction data and signals from the coupled payment transaction unit.

In some embodiments, the second wireless communication unit is a NFC enabled communication unit acting as a NFC passive target unit configured to draw its operating power from the payment transaction unit acting as a NFC initiator unit.

In other embodiments, the first and second wireless communication unit are both or the same NFC enabled communication unit, namely the first wireless communication unit and the provisioning unit are both active mode NFC communication unit, as NFC devices can work in peer-to-peer mode, which enables two active mode NFC-enabled devices to communicate with each other to exchange information in an adhoc fashion, wherein one of the devices will deactivate its RF field while it is waiting for data.

In some embodiments, the antenna unit comprises an antenna of a dimension of 10×24 mm. The dimension is desirable for conducting stable and reliable data communication with the payment transaction unit without the need of incorporating an antenna booster to ensure proper operations of the passive operation unit, as could be found in some prior art devices using a relatively small or miniature antenna. If the dimension of the antenna is relative large, then the hybrid device could not entirely fit into some traditional wearable devices, such as a traditional watch and jewellery.

In some embodiments, the secure element, the active operation unit, and the passive operation unit are configured to be operatively coupled with each other and mounted on a bendable board adapted for easy mounting on a non-planar or a curved surface or being readily insertable or embedded into a curved accommodating space.

Figure 2:
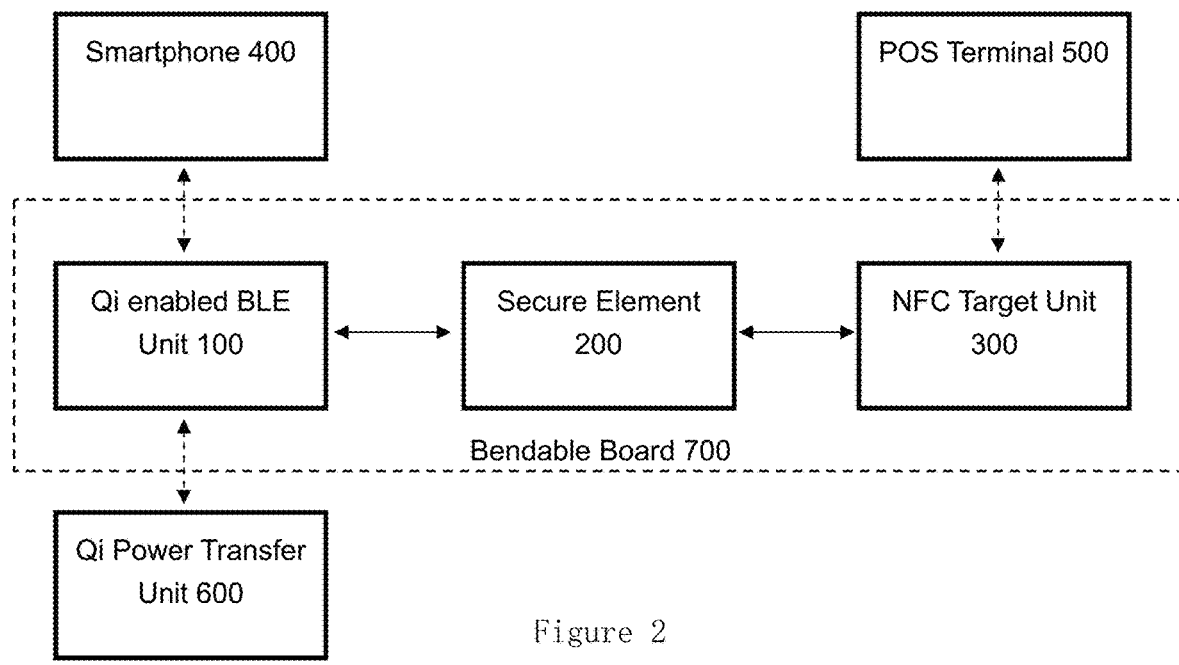
FIG. 2 is a block diagram of a battery-less active and passive hybrid device according to another preferred embodiment of the present disclosure.

Now referring to FIG. 2, a block diagram of a battery-less active and passive hybrid device according to another preferred embodiment of the present disclosure is illustrated, according to which the hybrid device for secure wireless payment comprises a secure element 200 adapted for storing at least one secure payment applet and at least one token for secure contactless payment and operatively connected with a Qi and BLE enabled active operation unit and a NFC enabled passive operation unit.

In some embodiments such as the embodiment as shown in the FIG. 2, the active operation unit is a Qi enabled BLE unit 100 comprising a Qi standard power receiver and the wireless power transfer unit is a Qi enabled power transfer unit 600 comprising a Qi standard power transmitter for providing wirelessly the power to the BLE unit for conducting wireless data communication with a provisioning unit, namely a smartphone 400 as shown in the FIG. 2. The passive operation unit is a NFC passive target unit 300 operatively coupled with and wirelessly powered by a payment transaction unit, namely a POS terminal 500, and configured to draw its operating power from the payment transaction unit acting as a NFC initiator unit for conducting payment token verification and/or contactless payment transaction operation with the payment transaction unit via the secure element 200.

Further, in the hybrid device as shown in FIG. 2, the secure element 200, the Qi enabled BLE unit 100, and the NFC passive target unit 300 are operatively coupled with each other and mounted on a bendable board 700 adapted for easy mounting on a non-planar or a curved surface and/or being readily insertable or embedded into a curved accommodating space.

In some embodiments, the hybrid device is mounted at and preferably embedded into a band or buckle of a traditional watch to replace the original band or buckle of the watch of a user for conducting contactless payment transactions and other applicable operations, such that the user could wear and use the watch in a traditional way while benefit from the contactless payment capabilities provided by the new and replaceable part of the watch.

Traditional watches are composed of mostly mechanical components and metal materials for the casing attached to a band or wrist strap. The wrist strap also can be produced in a variety of materials including leather, plastic, metals etc. Adding smart features such as payment applets on this segment of wearable under normal circumstances require a battery source to enable communications with external devices such as a smart phone.

The challenges or issues with adding an integrated battery source to a traditional wearable product are as follows:
  design and aesthetic issue, wherein the battery is rigid and the placement can take up space adding unnecessary thickness impacting aesthetic and designs;
  battery recharging issue, wherein the recurring use of a rechargeable battery requires added components and interface such as cable attachment to the device impacting aesthetics and productions costs of the final product;
  battery replacement issue, wherein all battery has a limited lifespan which needs replacement, whether or not the battery is rechargeable; and
  water resistant issue, wherein enclosure of battery and recharging cable interface can limit the water resistant ability of the overall device.

Accordingly, the technical solutions set forth by the present disclosure could apparently solve the foregoing technical problems for providing power to traditional and basic wearable product (including but not limited to, timepiece and jewellery) on demand while removing the dependency and need of an integrated battery. The present disclosure combines a bendable board enabling a unique payment token provisioning sequence to add NFC payment capabilities on traditional and basic wearable products without the need of an integrated battery source. The ability to decouple the battery from the wearable while having the ability to enable communications with smart devices through Bluetooth or similar technology is critical in overcoming all of foregoing challenges or issues in the prior art.

Figure 3:
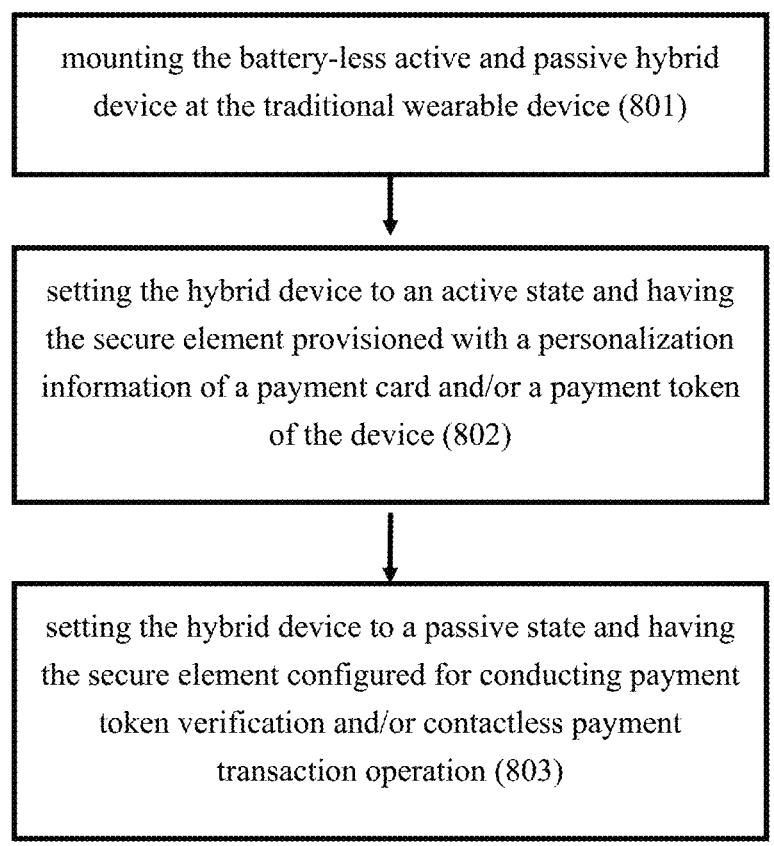
FIG. 3 is a flow chart of a method for providing contactless payment capabilities to a traditional wearable device by a battery-less active and passive hybrid device according to a further preferred embodiment of the present disclosure.

Referring to FIG. 3, which illustrates a flow chart for a method for providing contactless payment capabilities to a traditional wearable device by a battery-less active and passive hybrid device for secure wireless payment comprising a secure element adapted for storing at least one secure payment applet and at least one token for secure contactless payment and operatively connected with a passive data provisioning unit/an active operation unit and a passive operation unit, comprising steps of:
  mounting/embedding the battery-less active and passive hybrid device at/into the traditional wearable device (801);
  switching/setting the hybrid device to an active state and having the secure element provisioned with a personalization information of a payment card and/or a payment token of the device (802); and
  switching/setting the hybrid device to a passive state and having the secure element configured for conducting payment token verification and/or contactless payment transaction operation (803).

In some embodiments, the foregoing method comprises one or more of the following optional steps of:
  incorporating one or more biometric sensors (as will be described below in further details) with the hybrid device before mounting it into the i traditional wearable device;
  pairing up the hybrid device and and a mobile device via BLE for receiving one or more additional personalization information of one or more payment cards from the mobile device for conducting one or more additional provisioning operations with the secure element; and/or
  activating a biometric sensor incorporated with the hybrid device for conducting secondary authentication for conducting secure element provisioning process, payment token verification, and/or contactless payment transaction operation.

In some embodiments, the foregoing method comprises the steps of:
  mounting/embedding the battery-less active and passive hybrid device at/into the traditional wearable device;
  switching/setting the hybrid device to an active state by having the active operation unit activated wirelessly, or by an engageable and decoupleable or removably/decoupleably connected external power transfer unit, on demand to enable the hybrid device to function as an active device and the secure element provisioned with a personalization information of a payment card and/or a payment token of the device; and switching/setting the hybrid device to a passive state by having the active operation unit deactivated wirelessly, or by disengaging/decoupleabling with the external power transfer unit, on demand and the passive operation unit activated/configured to enable the hybrid device to function as a passive device and the secure element configured for conducting payment token verification and/or contactless payment transaction operation.

According to another aspect of the present disclosure, which provides a provisioning process flow for a battery-less active and passive hybrid device for secure wireless payment comprising a secure element adapted for storing at least one secure payment applet and at least one token for secure contactless payment as follows:

Step 1: Place the token band or the hybrid device with the secure element on top of an activated or powered token dock to receive wirelessly power from the token dock to power its BLE unit.

Step 2: Start a mobile application on a smartphone and complete the standard BLE pairing with the token band to initiate token services provisioning request with payment networks.

Step 3: The mobile application subsequently communicates with the SE over global platform standards and completes the personalization of the payment token securely on the SE.

Step 4: Remove the token band from the token dock and place the nonpowered passive token band over an NFC enabled point of sales terminal, which exerts power to an antenna on the token band to communicate with the payment applet and complete a NFC contactless payment transaction with the terminal.

Figure 4:
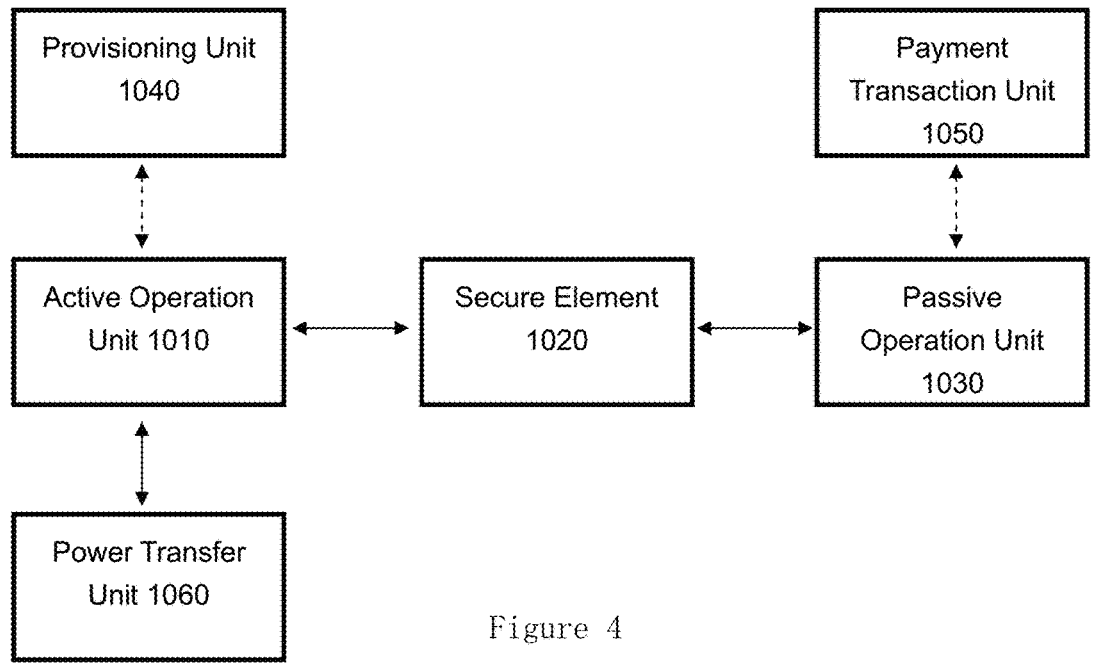
FIG. 4 is a block diagram of a battery-less active and passive hybrid device according to another preferred embodiment of the present disclosure.

Referring to FIG. 4, a block diagram of a battery-less active and passive hybrid device according to a preferred embodiment of the present disclosure is illustrated, according to which the hybrid device for secure wireless payment comprises a secure element 1020 adapted for storing at least one secure payment applet and at least one token for secure contactless payment and operatively connected with a passive data provisioning unit/an active operation unit 1010 and a passive operation unit 1030. The present embodiment and the embodiments as shown in FIG. 1 and FIG. 2 differ in that the active operation unit is preferably adapted to be engageable and decoupleable or connected removably/decoupleably with the secure element. For example, the active operation unit could be integrated with the power transfer unit or an interface for power transfer (such as an USB interface for receiving power from an external USB power source/socket/cable) and/or not to be mounted together nor connected permanently with the secure element and the passive operation unit on the hybrid device/the bendable board.

The hybrid device is configured to be switchable between an active state and a passive state in response to the working requirements and conditions for various operations as required. In the active state, the active operation unit 1010 is activated and powered on demand, e.g, by an external power source, to enable the hybrid device to function as an active device, and it is adapted for various operations requiring a relatively high and stable power consumption, among other, the operations for provisioning a personalization information of a payment card and/or a payment token of the device to the secure element. In this regard, the active operation unit enables the hybrid device to support installing and loading of third party applications to the secure element by the end user.

In the passive state, the active operation unit is deactivated, and/or decoupled with external power source, and the passive operation unit is activated/configured to enable the hybrid device to function as a passive device and adapted for various operations requiring a relatively low or transient power consumption, among other, conducting payment token verification and/or contactless payment transaction operation via the secure element, wherein the low or transient operating power could be drawn from a predetermined matching device adapted for working with a passive device.

In some embodiments such as the embodiment as shown in the FIG. 4, while in the active state the active operation unit 1010 is activated by operatively coupled with and powered by a power transfer unit 1060 for conducting wireless data communication with a provisioning unit, such as a dedicated machine, or a computer, a smart or mobile device comes with a dedicated module for provisioning data to the secure element 1020, whereby enabling the provisioning of the personalization information of the payment card, biometric data, health data, government related security data, hardware specific data, and/or the payment token of the device to the secure element from the provisioning unit.

In some embodiment such as the embodiment as shown in the FIG. 4, while in the passive state the passive operation unit 1030 is activated by operatively coupled with and wirelessly powered by a payment transaction unit 1050, such as a dedicated machine terminal, or a computer, a smart or mobile device comes with a dedicated module for contactless payment transaction with the secure element 1020, whereby enabling the conducting of payment token verification and/or contactless payment transaction operation with the payment transaction unit via the secure element.

In some embodiments, the active operation unit comprises a first wireless communication unit adapted for coupling and conducting wireless data communication with the personalization information and payment token provisioning unit. The first wireless communication unit is operatively coupled with a power receiver unit and/or a transient power storage unit, preferably a supercap, adapted for receiving and/or storing power from the coupled power transfer unit, so as to enable the completion of routine and specific operations of the hybrid device requiring a relatively high and stable operating power.

In some embodiments, the first wireless communication unit is a WIFI, BT, and/or NFC enabled communication unit, and preferably a BLE unit with a plurality of contacts (and preferably, 2 or 4 contacts), preferably waterproof and/or exposed contacts.

In some embodiments, the passive operation unit comprises a second wireless communication unit, adapted for coupling and conducting wireless data communication with the payment transaction unit and operatively coupled with an antenna unit for receiving its operating power and payment transaction data and signals from the coupled payment transaction unit.

In some embodiments, the second wireless communication unit is a NFC enabled communication unit acting as a NFC passive target unit configured to draw its operating power from the payment transaction unit acting as a NFC initiator unit.

In other embodiments, the first and second wireless communication unit are both or the same NFC enabled communication unit, namely the first wireless communication unit and the provisioning unit are both active mode NFC communication unit, as NFC devices can work in peer-to-peer mode, which enables two active mode NFC-enabled devices to communicate with each other to exchange information in an adhoc fashion, wherein one of the devices will deactivate its RF field while it is waiting for data.

In some embodiments, the antenna unit comprises an antenna of a preferred dimension of 10×30 mm, and more preferably 10×24 mm. The dimension is desirable for conducting stable and reliable data communication with the payment transaction unit without the need of incorporating an antenna booster to ensure proper operations of the passive operation unit, as could be found in some prior art devices using a relatively small or miniature antenna. If the dimension of the antenna is relative large, then the hybrid device might not be entirely fitted into some traditional wearable devices, such as a traditional watch and jewelry worn on wrist, waist, or neck, for example.

In some embodiments, the secure element, the active operation unit, and the passive operation unit are configured to be operatively coupled with each other and mounted on a bendable board adapted for easy mounting on a non-planar or a curved surface or being readily insertable or embedded into a curved accommodating space; or the active operation unit is adapted to be an external standalone unit and removably connected with the secure element and/or integrated with the power transfer unit rather than mounted on the bendable board.

Figure 5:
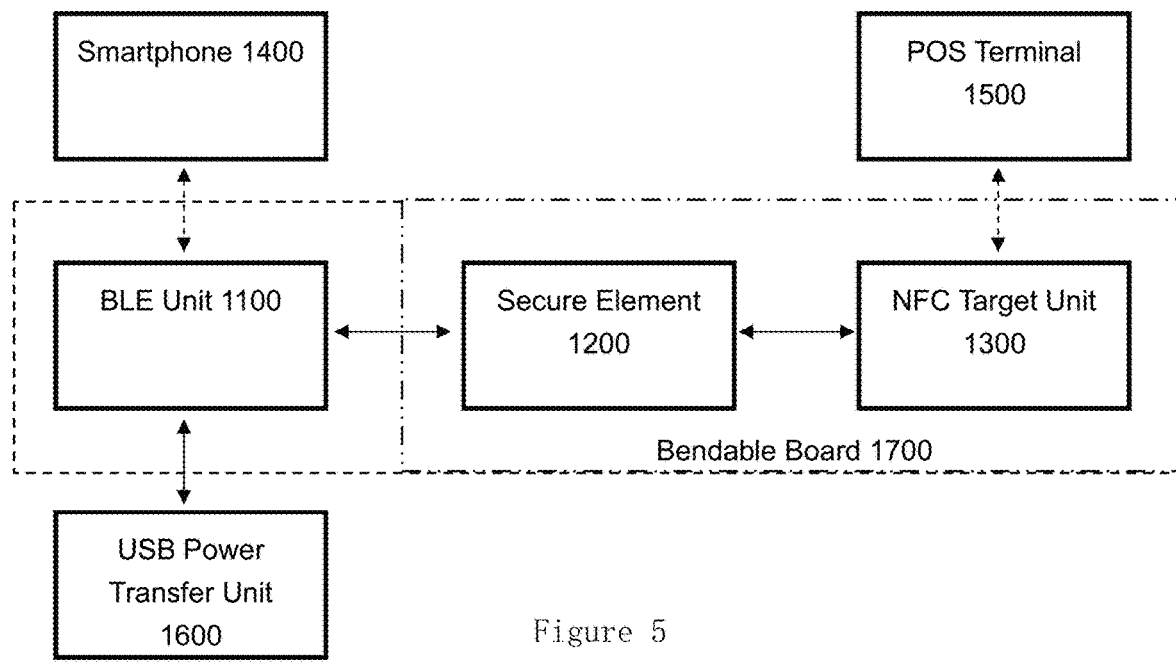
FIG. 5 is a block diagram of a battery-less active and passive hybrid device according to yet still another preferred embodiment of the present disclosure.

Now referring to FIG. 5, a block diagram of a battery-less active and passive hybrid device according to another preferred embodiment of the present disclosure is illustrated, according to which the hybrid device for secure wireless payment comprises a secure element 1200 adapted for storing at least one secure payment applet and at least one token for secure contactless payment and operatively connected with a BLE enabled passive data provisioning unit/active operation unit and a NFC enabled passive operation unit.

In some embodiments such as the embodiment as shown in the FIG. 5, the active operation unit is a BLE unit 1100 comprising a plurality of contacts for receiving power from removably coupled power transmitter and the power transfer unit is a USB power transfer unit 1600 comprising a USB power transmitter, preferably equipped with connection members, such as connection pins or hooks, and/or fixing or locking members for making contact and/or interlocking with the contacts of the BLE unit, whereby providing the power to the BLE unit for conducting wireless data communication with a provisioning unit, namely a smartphone 1400 as shown in the FIG. 5. The passive operation unit is a NFC passive target unit 1300 operatively coupled with and wirelessly powered by a payment transaction unit, namely a POS terminal 1500, and configured to draw its operating power from the payment transaction unit acting as a NFC initiator unit for conducting payment token verification and/or contactless payment transaction operation with the payment transaction unit via the secure element 1200.

Further, in the hybrid device as shown in FIG. 5, the secure element 1200, the BLE unit 1100, and the NFC passive target unit 1300 are operatively coupled with each other and mounted on a bendable board 1700 adapted for easy mounting on a non-planar or a curved surface and/or being readily insertable or embedded into a curved accommodating space. Alternatively, the BLE unit is adapted to be removably connected with the secure element without mounting fixedly on the bendable board; and/or the BLE unit might be integrated with the USB power transfer unit 1600, as will be described in further details below.

In some embodiments, the hybrid device is mounted at and preferably embedded into a band or buckle, preferably made of a non-metal material such as leather or plastic or the like to reduce the interference thereof, of a traditional watch to replace the original band or buckle of the watch of a user for conducting contactless payment transactions and other applicable operations, such that the user could wear and use the watch in a traditional way while benefit from the contactless payment capabilities provided by the new and replaceable part of the watch.

Figure 6:
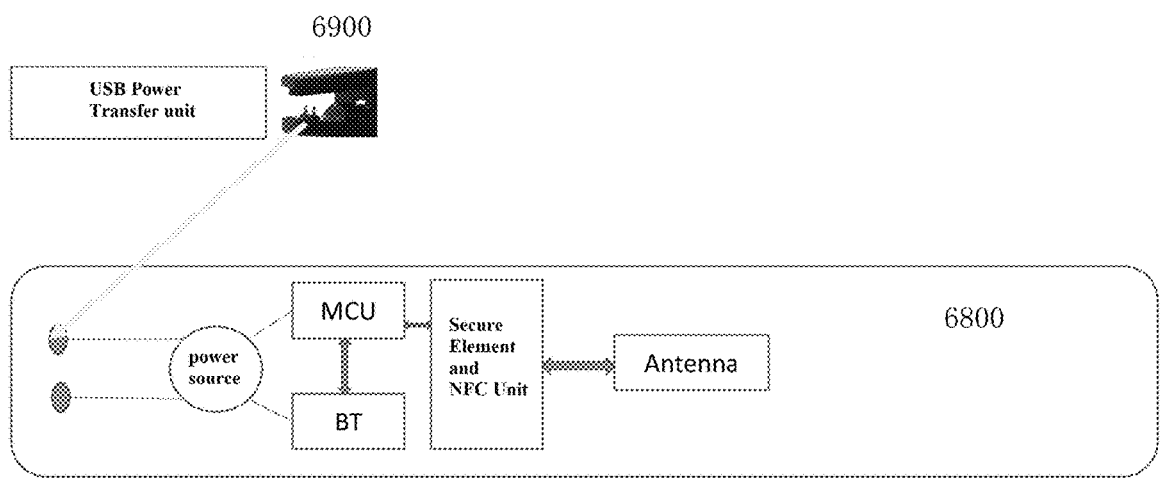
FIG. 6 is a schematic view of a watch band adopting the battery-less active and passive hybrid device according to one preferred embodiment of the present disclosure.

Referring to FIG. 6, a schematic view of a watch band 6800 adopting the battery-less active and passive hybrid device according to one preferred embodiment of the present disclosure is illustrated, wherein the power transfer unit is a USB power transfer unit 6900 substantially in the form of a clip/clamp or a forepart of clothes-pin. The USB power transfer unit comprises an upper part and a lower part on which a plurality of connection pins or hooks extended from the base of the lower part along a longitudinal axis are mounted firmly and adapted to engage with the respective contacts arranged in the watch band. The USB power transfer unit might further comprise at least one fixing or locking members (not shown) for making contact and/or interlocking with the contacts of the BLE unit. The power received through the contacts are used to power or activate directly the active operation unit, or activate an optional internal power source/accumulator (such as a supercap in electric connection with the contacts for receiving and storing power from the coupled USB power transfer unit) of the hybrid device embedded in the watch band for powering the active operation unit, comprising a MCU and BT/BLE unit operatively connected with the secure element and NFC unit. While in the passive state, the antenna of the passive unit will draws its operating power wirelessly from external payment transaction unit for powering the passive operation unit comprising the NFC unit operatively connected with the secure element and the antenna.

Figure 7:
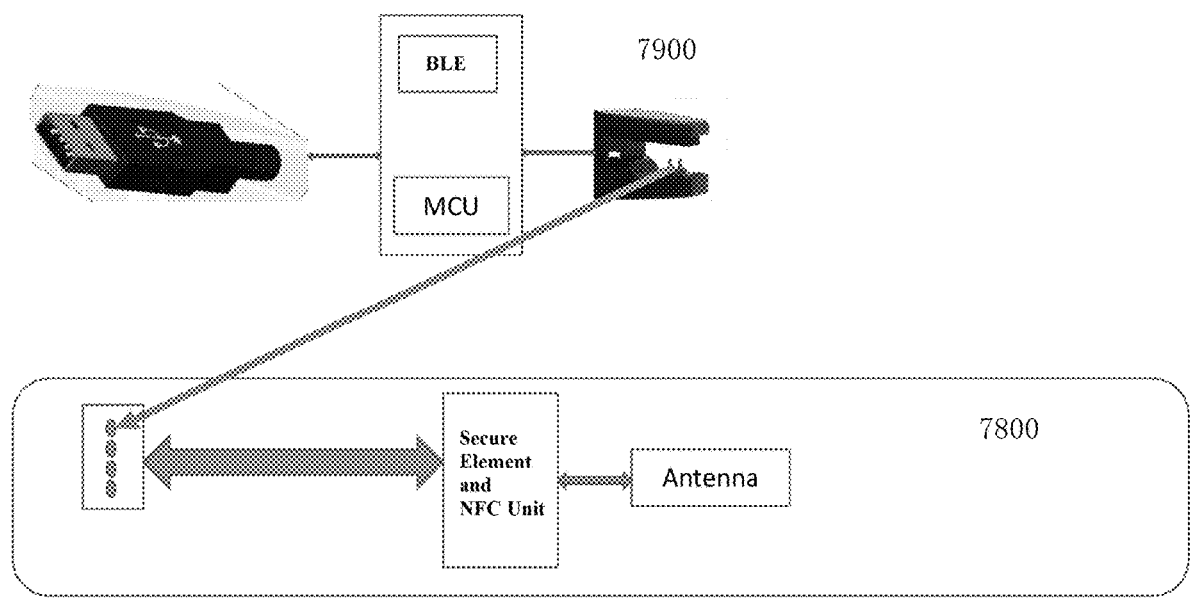
FIG. 7 is a schematic view of a watch band adopting the battery-less active and passive hybrid device according to another preferred embodiment of the present disclosure.

Now referring to FIG. 7, a schematic view of a watch band 7800 adopting the battery-less active and passive hybrid device according to another preferred embodiment of the present disclosure is illustrated, wherein the power transfer unit is a USB power transfer unit 7900 also substantially in the form of a clip/clamp or a forepart of clothes-pin and integrated with the active operation unit comprising the BLE unit and the MCU. In this regard, the active operation unit is removably connected with the secure element and only the secure element and the passive operation unit will be mounted on the bendable board and embedded into the watch band, and such configuration will simplify substantially the layout and design of the hidden or concealed part of the hybrid device being mounted and embedded into the wearable device, such as the watch band.

Similarly, the USB power transfer unit comprises an upper part and a lower part on which a plurality of connection pins or hooks extended from the base of the lower part along a longitudinal axis are mounted firmly and adapted to engage with the respective contacts arranged in the watch band and/or on the bendable board on which the secure element and passive operation unit are mounted. The USB power transfer unit might further comprise at least one fixing or locking members (not shown) for making contact and/or interlocking with the contacts operatively connected with the secure element and the NFC unit. The coupling between the connection pins and the contacts is adapted for provisioning personalization information of a payment card and/ or a payment token of the device to the secure element via the external active operation unit. The contacts are adapted for enabling the power transmission and data communication between the external action operation unit and the secure element. In this embodiment, there are four contacts such that data and power signal could be transferred concurrently to facilitate the operation of the active operation unit and the secure element. While in the passive state, the antenna will draws its operating power wirelessly from external payment transaction unit for powering the passive operation unit comprising the NFC unit operatively connected with the secure element and the antenna.

In some embodiments, the watch band and/or the bendable board comprise one or more optional second contacts adapted for provision of additional functions. For example, one of the optional second contacts is a reset contact to enable a warm or cold reboot/reset of the operating system/the kernel of the secure element when necessary. In this regard, the power transfer unit also comprises one or more optional second connection pins or hooks adapted for making electric connection with the respective second contacts for implementation of the relevant additional functions.

Figure 8:
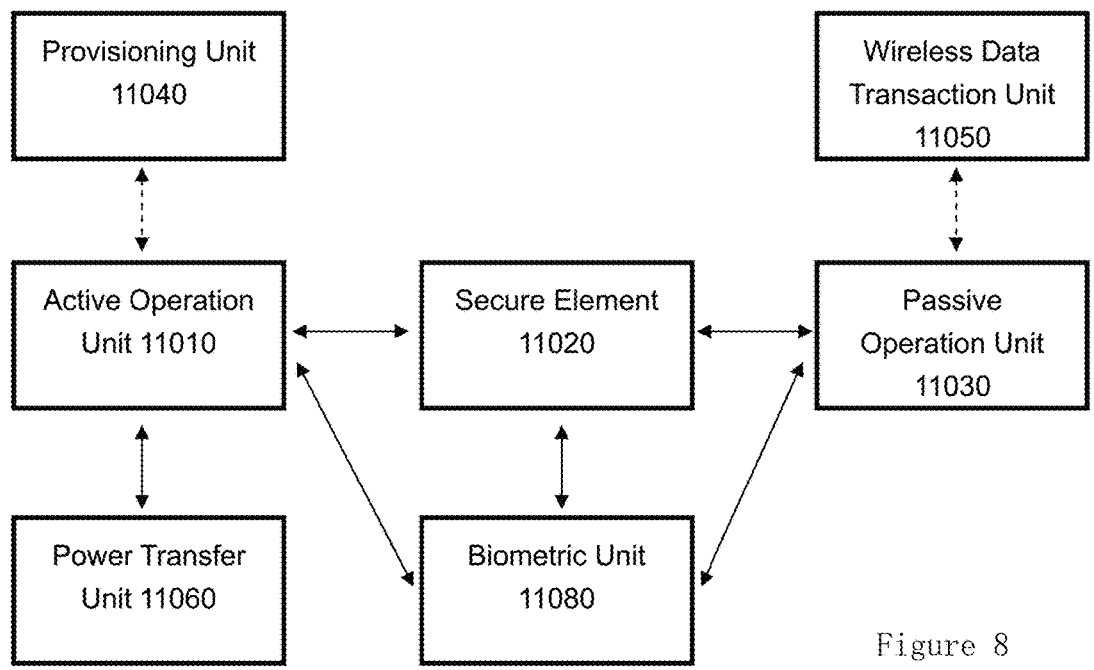
FIG. 8 is a block diagram of a battery-less active and passive hybrid device according to another preferred embodiment of the present disclosure.

Referring to FIG. 8, a block diagram of a battery-less active and passive hybrid device according to a preferred embodiment of the present disclosure is illustrated, according to which the hybrid device adapted for various secure applications/operations/communication comprises a secure element 11020 adapted for storing at least one secure applet for conducting various secure applications/operations and at least one data segment/memory for secure contactless data transaction/exchange and operatively connected with an active operation unit 11010 and a passive operation unit 11030. The present embodiment is similar to the one as shown in FIG. 4 in structural, operational, and functional aspects, while the present embodiment and the embodiments as shown in FIGS. 1-2 and FIGS. 4-5 differ basically in that it further comprise a biometric unit 11080 for secondary or biometric authentication of user identity comprising one or more biometric readers/sensors capable of reading, writing and/or processing biometric data related to one or more of the following items/entries: fingerprint, palm/finger vein pattern, voice pattern, face recognition, DNA, palm print, hand geometry, iris recognition, and/or retina. The biometric unit 11080 is preferably a passive device and operatively connected with the secure element 11020, the active operation unit 11010, and the passive operation unit 11030 as shown in the figure. Definitely and apparently, the biometric unit could be also incorporated by and for use with all of the above embodiments in a similar manner.

Further, the hybrid device of the present embodiment is adapted not only for wireless payment but also for wireless data transaction/communication for use in various secure applications/operations as the secure element operated in active state could be provisioned with not only information of payment card and token for payment transaction, but also biometric data, health data, hardware specific data, and/or Government related security data and the like. In this regard, the hybrid device could be also adapted at least for use with various access control systems, intelligent remote key systems for automobile, medical systems, or the like.

In some embodiments, the hybrid device or the secure element operated in active state is provisioned with personalization information and/or biometric data of authorized user/personnel and a secure applet configured for use with an access control system via the provisioning unit 11040 and active operation unit 11010. In operation, the hybrid device operated in passive state plays the role of an access card or ID badge of the access control system, and the passive operation unit 11030 draws its operating power from a card reader or a dedicated wireless data transaction unit 11050 playing the role of the card reader of the access control system, such that the secure applet is activated to communicate wirelessly with the access control system for verification of user identity whereby opening respective doors controlled by the access control system if the verification result is positive. If a secondary authentication or biometric data is required by the access control system, the secure element or the secure applet operated in passive state receives and/or processes the biometric data of user provided by the biometric unit and forward wirelessly the original or processed biometric data to the access control system to ensure the security thereof.

In some embodiments, the hybrid device or the secure element operated in active state is provisioned with hardware specific data (such as intelligent key data of intelligent key system for one or more automobiles for activation and proper operations of the automobiles) and/or biometric data of authorized person/driver and a secure applet configured for use with the respective intelligent key systems for automobile via the provisioning unit 11040 and active operation unit 11010. In operation, the hybrid device operated in passive state plays the role of an intelligent key or remote controller of the intelligent key system embedded or installed in the automobile, and the passive operation unit 11030 draws its operating power from a key reader or a dedicated wireless data transaction unit 11050 playing the role of the key reader of the intelligent key system of the automobile, such that the secure applet is activated to communicate wirelessly with the key system of the automobile for verification of driver identity whereby activating and operating respective parts controlled by the intelligent key system if the verification result is positive. If a secondary authentication or biometric data is required by the intelligent key system, the secure element or the secure applet operated in passive state receives and/or processes the biometric data of user provided by the biometric unit and forward wirelessly the original or processed biometric data to the intelligent key system to ensure the security and proper operation thereof.

In some embodiments, the hybrid device or the secure element operated in active state is provisioned with health data and/or biometric data of a participant/patient registered with an intelligent medical system and a secure applet configured for use with the medical system via the provisioning unit 11040 and active operation unit 11010. The health data comprises physical condition data, medical history data, historical prescription data of previous treatments or diagnoses, or the like. In operation, the hybrid device operated in passive state plays the role of an intelligent medical card or a smart card for personal identification for the medical system, and the passive operation unit 11030 draws its operating power from a card reader or a dedicated wireless data transaction unit 11050 playing the role of the card reader of the intelligent medical system, such that the secure applet is activated to communicate wirelessly with the intelligent medical system for verification of patient identity whereby enabling the provision and accessing of the medical history or the like by medical staffs of the intelligent medical system if the verification result is positive. If a secondary authentication or biometric data is required by the intelligent medical system, the secure element or the secure applet operated in passive state receives and/or processes the biometric data of the participant/patient provided by the biometric unit and forward wirelessly the original or processed biometric data to the intelligent medical system to ensure the security and proper operation thereof.

In some embodiments, the hybrid device or the secure element operated in active state is provisioned with government related security data and/or biometric data of a citizen or a resident governed by the government and a secure applet configured for use with an intelligent system or a smart city program provided by the government via the provisioning unit 11040 and active operation unit 11010. The government related security data comprises ID card or passport data, immigration or travel record data, contact information data, driving license data, or the like. In operation, the hybrid device operated in passive state plays the role of an smart ID card for personal identification required by various intelligent systems or services provided by the government, and the passive operation unit 11030 draws its operating power from a card reader or a dedicated wireless data transaction unit 11050 playing the role of the card reader, such that the secure applet is activated to communicate wirelessly with the intelligent system for verification of personal identity whereby enabling the employment and accessing of various intelligent systems or services provided by the government if the verification result is positive. If a secondary authentication or biometric data is required by the intelligent system or services, the secure element or the secure applet operated in passive state receives and/or processes the biometric data of the participant/patient provided by the biometric unit and forward wirelessly the original or processed biometric data to the intelligent system to ensure the security and proper operation thereof.

The hybrid device is configured to be switchable between an active state and a passive state in response to the working requirements and conditions for various operations as required. In the active state, the active operation unit 11010 is activated and powered on demand, e.g, by an external power source, to enable the hybrid device to function as an active device, and it is adapted for various operations requiring a relatively high and stable power consumption, among other, the operations for provisioning one or more personalization information data, biometric data, health data, government related security data, hardware specific identification data and/or a token of the device to the secure element. In this regard, the active operation unit enables the hybrid device to support installing and loading of third party applications and application-specific data to the secure element by the end user.

In the passive state, the active operation unit is deactivated, and/or decoupled with external power source, and the passive operation unit is activated/configured to enable the hybrid device to function as a passive device and adapted for various operations requiring a relatively low or transient power consumption, among other, conducting data verification and/or contactless data transaction operation via the secure element, wherein the low or transient operating power could be drawn from a predetermined matching device adapted for working with a passive device.

In some embodiments such as the embodiment as shown in the FIG. 8, while in the active state the active operation unit 11010 is activated by operatively coupled with and powered by a power transfer unit 11060 for conducting wireless data communication with a provisioning unit, such as a dedicated machine, or a computer, a smart or mobile device comes with a dedicated module for provisioning data to the secure element 11020, whereby enabling the provisioning of the personalization information or the like and/or the token of the device to the secure element from the provisioning unit.

In some embodiment such as the embodiment as shown in the FIG. 8, while in the passive state the passive operation unit 11030 is activated by operatively coupled with and wirelessly powered by a data transaction unit 11050, such as a dedicated machine terminal, or a computer, a smart or mobile device comes with a dedicated module for contactless payment transaction with the secure element 11020, whereby enabling the conducting of data verification and/or contactless data transaction operation with the payment transaction unit via the secure element.

Figure 9:
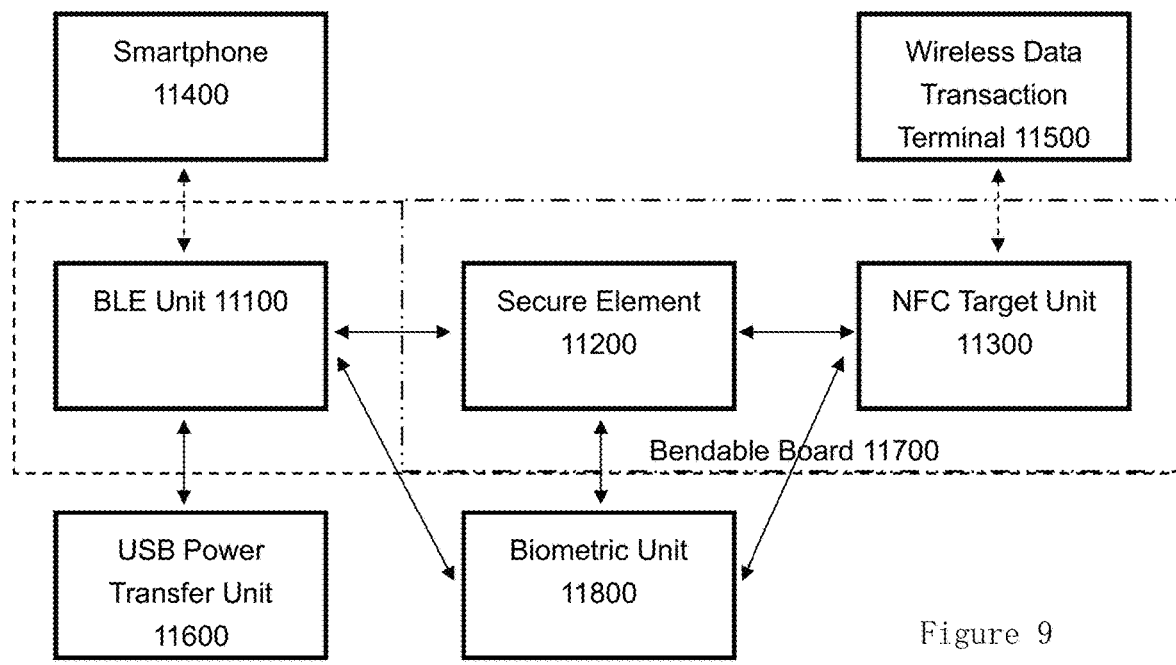
FIG. 9 is a block diagram of a battery-less active and passive hybrid device according to yet still another preferred embodiment of the present disclosure.

Now referring to FIG. 9, a block diagram of a battery-less active and passive hybrid device according to another preferred embodiment of the present disclosure is illustrated, according to which the hybrid device adapted for various secure applications/operations/communication comprises a secure element 11200 adapted for storing at least one secure applet for conducting various secure applications/operations and at least one data segment/memory for secure contactless data transaction/exchange and operatively connected with a BLE enabled active operation unit and a NFC enabled passive operation unit. The present embodiment is similar to the one as shown in FIG. 5 in structural, operational, and functional aspects, while the present embodiment and the embodiments as shown in FIGS. 1-2 and FIGS. 4-5 differ basically in that it further comprise a biometric unit 11800 for secondary or biometric authentication of user identity comprising one or more biometric readers/sensors capable of reading, writing and processing biometric data related to vein pattern, fingerprints, hand geometry, DNA, voice pattern, iris pattern, signature dynamics and/or face detection. The biometric unit 11800 is operatively connected with the secure element 11200, the BLE unit 11100, and the NFC target unit 11300 as shown in the figure. Definitely and apparently, the biometric unit could be also incorporated by and for use with all of the above embodiments in a similar manner.

In some embodiments such as the embodiment as shown in the FIG. 9, the active operation unit is a BLE unit 11100 comprising a plurality of contacts for receiving power from removably coupled power transmitter and the power transfer unit is a USB power transfer unit 11600 comprising a USB power transmitter, preferably equipped with connection members, such as connection pins or hooks, and/or fixing or locking members for making contact and/or interlocking with the contacts of the BLE unit, whereby providing the power to the BLE unit for conducting wireless data communication with a provisioning unit, namely a smartphone 11400 as shown in the FIG. 9. The passive operation unit is a NFC passive target unit 11300 operatively coupled with and wirelessly powered by a payment transaction unit, namely a wireless data transaction terminal 11500, and configured to draw its operating power from the payment transaction unit acting as a NFC initiator unit for conducting data verification and/or contactless data transaction operation with the data transaction terminal via the secure element 11200.

Further, in the hybrid device as shown in FIG. 9, the secure element 11200, the BLE unit 11100, and the NFC passive target unit 11300 are operatively coupled with each other and mounted on a bendable board 11700 adapted for easy mounting on a non-planar or a curved surface and/or being readily insertable or embedded into a curved accommodating space. In some embodiments, the biometric unit 11800 is also operatively coupled with the secure element 11200, the BLE unit 11100, and the NFC passive target unit 11300 and mounted together with them on the bendable board 11700. Alternatively, the BLE unit is adapted to be removably connected with the secure element without mounting fixedly on the bendable board; and/or the BLE unit might be integrated with the USB power transfer unit 11600, similar to the foregoing embodiments.

In some embodiments, the hybrid device is mounted at and preferably embedded into a band or buckle, preferably made of a non-metal material such as leather or plastic or the like to reduce the interference thereof, of a traditional watch to replace the original band or buckle of the watch of a user for conducting contactless data transactions and other applicable operations making use of biometric data, health data, hardware specific data, and/or Government related security data and the like, such that the user could wear and use the watch in a traditional way while benefit from the contactless secure data communication/processing capabilities provided by the new and replaceable part of the watch.

Figure 10A:
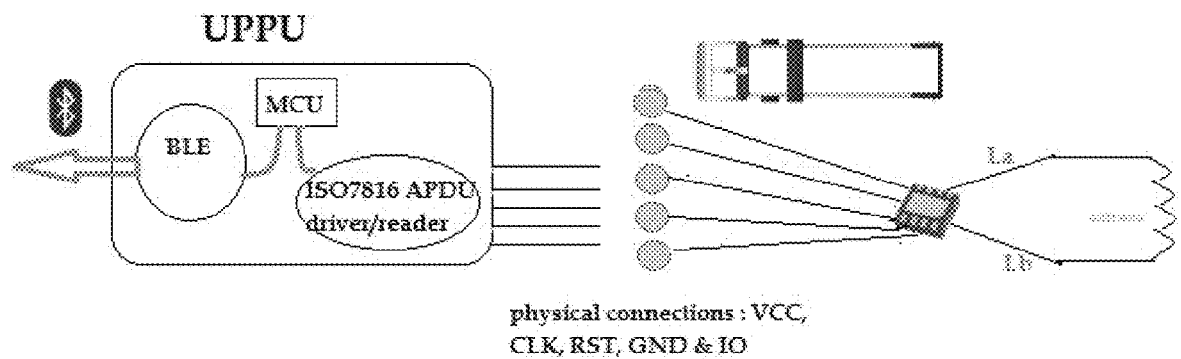
FIG. 10a is a schematic view of an universal passive provisioning unit adopted by the battery-less active and passive hybrid device according to one preferred embodiment of the present disclosure.
Figure 10B:
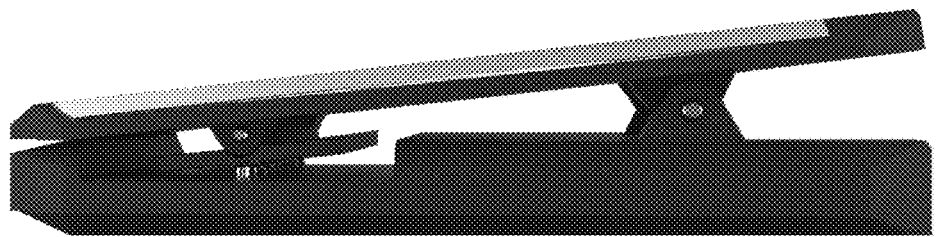
FIG. 10b is a schematic view of a clip type universal passive provisioning unit adopted by the battery-less active and passive hybrid device according to another preferred embodiment of the present disclosure.

Referring to FIGS. 10a-10b, schematic views of an universal passive provisioning unit or the active operation unit adopted by the battery-less active and passive hybrid device according to one preferred embodiment of the present disclosure are illustrated, wherein the active operation unit is integrated with the power transfer unit and/or an interface for power transfer to form an universal passive provisioning unit being substantially in form of a clip/clamp or a forepart of clothes-pin and adapted for provisioning various matched and compatible smart wearables of various forms and dimensions (such us a wristband or a watch band of various dimensions as described above). The power transfer unit/the interface for power transfer of the embodiment is a USB power transmitter or a USB interface/cable with ends connected respectively with a USB power socket (e.g. the power socket on a smartphone, or a mobile device. a computer, or the like) and a proximal end (such as the rightmost end in the figure) of the universal passive provisioning unit. The universal passive provisioning unit comprises a BLE controller/unit and a ISO7816 type APDU driver/reader unit operatively connected with a MCU, which comes with a plurality of connection pins, such as 5 connection pins (namely the VCC, CLK, RST, GND, and IO pins) as shown in the FIG. 10a, for enabling a detachable connection and communication with the secure element and NFC unit mounted on a passive bendable board embedded or mounted into a smart wearable device, such as a wristband or watch band with 5 contacts as shown in the FIG. 10a. The connection pins of the universal passive provisioning unit are adapted for engaging or coupling with the 5 contacts for provisioning one or more personalization information data, biometric data, health data, government related security data, hardware specific data, and/or a token of the device to the secure element. After provisioning process, the universal passive provisioning unit will be disengaged with the bendable board, such that the passive bendable board is now adapted and suitable for conducting data verification and/or contactless data transaction operation with dedicated terminal or conventional POS terminals via the secure element.

Referring to FIG. 10b, the universal passive provisioning unit substantially in the form of a clip/clamp or a forepart of clothes-pin and adapted for provisioning various matched and compatible smart wearables of various forms and dimensions (such us a wristband or a watch band of various dimensions as described above and shown in the figure) is depicted, which is similar to the power transfer unit shown in FIGS. 6-7 in terms of their appearance and also comprises a lower part with a flattened portion located at its proximal end and a depressed portion at its distal end on which a plurality of connection members are arranged for enabling power and signal transmission; and an upper part hingeably mounted over the lower part and configured to be switchable between an opened position/state in which its proximal end is configured to make contact with the proximal end of the lower part and its distal end is configured to disengage with the distal end of the lower part, such that the connection members and depressed portion are accessible to receive at least partly a respective external engageable passive member (such as a wristband or a watch band as described above and shown in FIG. 10b) comprising the secure element and passive operation unit adapted for conducting power and data transmission or operation therebetween, such as operation for provisioning of personalization information data, biometric data, health data, government related security data, hardware specific identification data, and/or a token of the device; and a closed position/state (the position as shown in FIG. 10b) in which its distal end is configured to make contact with the distal end of the lower part and its proximal end is configured to disengage with the proximal end of the lower part, such that the connection members and depressed portion are covered by the upper part and the engaged passive member is sandwiched between and locked by the upper and lower parts for facilitating the power and data transmission or operation therebetween. As can be seen from the figure, an optional protrusion extended in a width direction is arranged at the bottom side of the upper part and positioned at a location corresponding to the same of the connection members arranged at the lower art, so as to act as an optional fixing or locking member for facilitating or securing the engagement between the the universal passive provisioning unit and the passive member, as shown in the FIG. 10b. After completion of the the power and data transmission or operation, such as operation for provisioning, the upper part might be hinged or switched to the opened position/state and the provisioned passive member could be removed from the depressed portion and is made ready and configured for conducting data verification and/or contactless data transaction operation with dedicated terminals or conventional terminals, such as a NFC POS terminal, via the secure element.

The present disclosure is described according to specific embodiments, but those skilled in the art will appreciate that various changes and equivalents might be made without departing from the scope of the present disclosure. In addition, many modifications might be made to the present disclosure without departing from the scope of the invention in order to adapt to specific circumstances or components of the present disclosure. Accordingly, the present disclosure is not limited to the specific embodiments disclosed herein, and shall include all embodiments falling within the scope of the claims.

The invention claimed is:

1. A battery-less active and passive hybrid device for secure wireless data transaction comprising:
   a secure element adapted for storing at least one secure applet and at least one data segment for secure contactless data transaction and operatively connected with an active operation unit and a passive operation unit; and preferably the active operation unit is adapted to be connected removably with the secure element; and
   wherein the hybrid device is configured to be switchable between an active state in which the active operation unit is activated on demand to enable the hybrid device to function as an active device and adapted for provisioning one or more personalization information data, biometric data, health data, government related security data, hardware specific data, and/or a token of the device to the secure element; and a passive state in which the active operation unit is deactivated and the passive operation unit is activated/configured to enable the hybrid device to function as a passive device and adapted for conducting data verification and/or contactless data transaction operation via the secure element.

2. The hybrid device according to claim 1, wherein in the active state the active operation unit is activated by operatively coupled with and powered by a power transfer unit for conducting wireless data communication with a provisioning unit, preferably a smartphone, for provisioning of the personalization information data, biometric data, health data, government related security data, hardware specific data, and/or the token of the device to the secure element from the provisioning unit.

3. The hybrid device according to claim 1, wherein in the passive state the passive operation unit is activated by operatively coupled with and wirelessly powered by a data transaction unit, preferably a data transaction terminal, for conducting data verification and/or contactless data transaction operation with the data transaction unit via the secure element.

4. The hybrid device according to claim 2, wherein the active operation unit comprises a first wireless communication unit adapted for coupling and conducting wireless data communication with the provisioning unit, and operatively coupled with a power receiver unit and/or a transient power storage unit, preferably a supercap, adapted for receiving and/or storing power from the coupled power transfer unit.

5. The hybrid device according to claim 4, wherein the first wireless communication unit is a WIFI, BT, and/or NFC enabled communication unit, and preferably a BLE unit with contacts, preferably waterproof and/or exposed contacts.

6. The hybrid device according to claim 5, wherein the power transfer unit is a USB power transmitter, preferably equipped with connection members, preferably connection pins or hooks, and/or fixing or locking members for making contact and/or interlocking with the contacts of the BLE unit.

7. The hybrid device according to claim 3, wherein the passive operation unit comprises a second wireless communication unit, preferably a NFC enabled communication unit, adapted for coupling and conducting wireless data communication with the data transaction unit and operatively coupled with an antenna unit for receiving its operating power and data transaction data and signals from the coupled data transaction unit.

8. The hybrid device according to claim 7, wherein the second wireless communication unit is a NFC enabled communication unit acting as a NFC passive target unit configured to draw its operating power from the data transaction unit acting as a NFC initiator unit.

9. The hybrid device according to claim 7, wherein the antenna unit comprises an antenna of a dimension of 10×24 mm adapted to draw operating power directly from a data signal generated from the data transaction unit without incorporating any active booster for amplifying the data signal.

10. The hybrid device according to claim 1, wherein the secure element, the active operation unit, and the passive operation unit are configured to be operatively coupled with each other and mounted on a battery-less bendable board adapted for easy mounting on a non-planar or a curved surface or being readily insertable or embedded into a curved accommodating space; or the active operation unit is adapted to be removably connected with the secure element and/or integrated with the power transfer unit; and/or the hybrid device further comprise a biometric unit for biometric authentication comprising one or more biometric readers/sensors for reading, writing and/or processing processing biometric data related to fingerprint, palm/finger vein pattern, voice pattern, face recognition, DNA, palm print, hand geometry, iris recognition, and/or retina.

11. The hybrid device according to claim 1, wherein the active operation unit is integrated with a power transfer or receiver unit and/or an interface for power transfer to form an universal passive provisioning unit for secure element being substantially in form of a clip/clamp or a forepart of clothes-pin and comprising a lower part with a flattened portion located at its proximal end and a depressed portion at its distal end on which a plurality of connection members are arranged for enabling power and signal transmission; and an upper part hingeably mounted over the lower part to be switchable between an opened position/state in which its proximal end is configured to make contact with the proximal end of the lower part and its distal end is configured to disengage with the distal end of the lower part to make the connection members and depressed portion accessible and a closed position/state in which its distal end is configured to make contact with the distal end of the lower part and its proximal end is configured to disengage with the proximal end of the lower part to make the connection members and depressed portion covered and concealed by the upper part.

12. A method for providing contactless data transaction capabilities to a traditional wearable device by a battery-less active and passive hybrid device for secure wireless data transaction comprising a secure element adapted for storing at least one secure applet and at least one data segment for secure contactless data transaction and operatively connected with an active operation unit, preferably adapted to be connected removably with the secure element, and a passive operation unit, comprising steps of:

mounting or embedding the battery-less active and passive hybrid device at or into the traditional wearable device; switching or setting the hybrid device to an active state by having the active operation unit activated on demand to enable the hybrid device to function as an active device and the secure element provisioned with one or more personalization information data, biometric data, health data, government related security data, hardware specific identification data, and/or a token of the device; and switching or setting the hybrid device to a passive state by having the active operation unit deactivated and the passive operation unit activated/configured to enable Me hybrid device to/unction as a passive device and Me secure element configured for conducting data verification and/or contactless data transaction operation via the secure element.

13. The method for providing contactless data transaction capabilities to a traditional wearable device according to claim 12, wherein in the active state the active operation unit is activated by operatively coupled with and powered by a power transfer unit for conducting wireless data communication with a provisioning unit, preferably a smartphone, for provisioning of the personalization information data, biometric data, health data, government related security data, hardware specific identification data, and/or the token of the device to the secure element from the provisioning unit; and/or in the passive state the passive operation unit is activated by operatively coupled with and wirelessly powered by a data transaction unit, preferably a data transaction terminal, for conducting data verification and/or contactless data transaction operation with the data transaction unit via the secure element.

14. The method for providing contactless data transaction capabilities to a traditional wearable device according to claim 12, wherein the active operation unit comprises a first wireless communication unit adapted for coupling and conducting wireless data communication with the provisioning unit, and operatively coupled with a power receiver unit and/or a transient power storage unit, preferably a supercap, adapted for receiving and/or storing power from the coupled power transfer unit.

15. The method for providing contactless data transaction capabilities to a traditional wearable device according to claim 14, wherein the first wireless communication unit is a WIFI, BT, and/or NFC enabled communication unit, and preferably a BLE unit with contacts, preferably waterproof and/or exposed contacts.

16. The method for providing contactless data transaction capabilities to a traditional wearable device according to claim 15, wherein the power transfer unit is a USB power transmitter, preferably equipped with connection members, preferably connection pins or hooks, and/or fixing or locking members for making contact and/or interlocking with the contacts of the BLE unit.

17. The method for providing contactless data transaction capabilities to a traditional wearable device according to claim 13, wherein the passive operation unit comprises a second wireless communication unit, preferably a NFC enabled communication unit, adapted for coupling and conducting wireless data communication with the data transaction unit and operatively coupled with an antenna unit for receiving its operating power and data transaction data and signals from the coupled data transaction unit.

18. The method for providing contactless data transaction capabilities to a traditional wearable device according to claim 17, wherein the second wireless communication unit is a NFC enabled communication unit acting as a NFC passive target unit configured to draw its operating power from the payment transaction unit acting as a NFC initiator unit; and/or the antenna unit comprises an antenna of a dimension of 10×24 mm adapted to draw operating power directly from a data signal generated from the data transaction unit without incorporating any active booster for amplifying the data signal.

19. The method for providing contactless data transaction capabilities to a traditional wearable device according to claim 12, wherein the secure element, the active operation unit, and the passive operation unit are configured to be operatively coupled with each other and mounted on a bendable board adapted for easy mounting on a non-planar or a curved surface or being readily insertable or embedded into a curved accommodating space; or the active operation unit is adapted to be removably connected with the secure element and/or integrated with the power transfer unit; and/or the hybrid device further comprise a biometric unit for biometric authentication comprising one or more biometric readers/sensors for reading, writing and/or processing processing biometric data related to fingerprint, palm/finger vein pattern, voice pattern, face recognition, DNA, palm print, hand geometry, iris recognition, and/or retina.

* * * * *